United States Patent
Chiang et al.

(10) Patent No.: US 10,604,700 B2
(45) Date of Patent: Mar. 31, 2020

(54) METHOD FOR MANUFACTURING NITRIDE PHOSPHOR

(71) Applicant: BELL CERAMICS CO., LTD., New Taipei (TW)

(72) Inventors: Chang-Lung Chiang, New Taipei (TW); Mu-Huai Fang, New Taipei (TW); Chia-Shen Hsu, New Taipei (TW); Ru-Shi Liu, New Taipei (TW); Chaochin Su, New Taipei (TW); Te-Hsin Chiang, New Taipei (TW)

(73) Assignee: BELL CERAMICS CO., LTD., New Taipei (TW)

( * ) Notice: Subject to any disclaimer, the term of this patent is extended or adjusted under 35 U.S.C. 154(b) by 344 days.

(21) Appl. No.: 15/801,246

(22) Filed: Nov. 1, 2017

(65) Prior Publication Data

US 2018/0362844 A1    Dec. 20, 2018

(30) Foreign Application Priority Data

Jun. 16, 2017  (TW) .............................. 106120124 A

(51) Int. Cl.
*C09K 11/08* (2006.01)
*C09K 11/77* (2006.01)

(52) U.S. Cl.
CPC ...... *C09K 11/0883* (2013.01); *C09K 11/7734* (2013.01)

(58) Field of Classification Search
CPC ..................... C09K 11/7734; C09K 11/0883
See application file for complete search history.

(56) References Cited

U.S. PATENT DOCUMENTS

2016/0040063 A1* 2/2016 Shimooka ............. H01L 33/502
257/98

OTHER PUBLICATIONS

Pust, Philipp, "Narrow-band red-emitting Sr[LiAl3N4]:Eu2+ as a next-generation LED-phosphor material", Nature Materials, 2014, pp. 891-896, vol. 13, Macmillan Publishers Limited.

* cited by examiner

*Primary Examiner* — C Melissa Koslow
(74) *Attorney, Agent, or Firm* — Michael W. Ferrell; Ferrells, PLLC; Anna Kinney

(57) ABSTRACT

A method for manufacturing a nitride phosphor is provided. The method comprises providing a nitride phosphor formulation and subjecting the nitride phosphor formulation to a hot isostatic pressing step. The nitride phosphor formulation comprises a flux and a phosphor precursor, wherein the flux is a barium-containing nitride. The phosphor precursor comprises two or more metal nitrides, and wherein a plurality of metal elements are present in the nitride phosphor and the two or more metal nitrides contain the plurality of metal elements.

20 Claims, 4 Drawing Sheets

METHOD FOR MANUFACTURING NITRIDE PHOSPHOR

CLAIM FOR PRIORITY

This application claims the benefit of Taiwan Patent Application No. 106120124 filed on Jun. 16, 2017, the subject matters of which are incorporated herein in their entirety by reference.

BACKGROUND OF THE INVENTION

Field of the Invention

The present invention provides a method for manufacturing a nitride phosphor, specifically through a hot isostatic pressing by using a barium-containing nitride as a flux.

Descriptions of the Related Art

White light-emitting diodes (WLED) have become the mainstream white light illumination system because it is small, stable and environmentally friendly and has good emission efficiency. All the experts in academia and industry are dedicating themselves to improving the emission performance of white light-emitting diodes to widen its application in human life.

The phosphor is one of the essential materials of light-emitting diodes. In 1996, a Japanese company, Nichia Chemical Company, invented a white light-emitting diode using a cerium-doped yttrium aluminum garnet (YAG) phosphor ($Y_3Al_5O_{12}:Ce^{3+}$, YAG:Ce). Such a phosphor can be excited to generate yellow light by using a blue light source (e.g., a blue light-emitting diode), and the generated yellow light can be mixed with the blue light from the blue light source to provide the desired white light. Such a white light-emitting diode is low-cost but poor on color rendering. Therefore, the technique of using a red phosphor in such a white light-emitting diode was then invented to improve color rendering.

Light-emitting diodes have replaced cold cathode fluorescent lamps that are used as the backlight of a back-lit display. Light-emitting diodes can not only effectively lower the power dissipation and heat loss of the display device, but also have a wider color gamut and are more environmentally friendly. The backlight is a common illumination form of display devices. The difference between backlight and front-light primarily lies in that the backlight allows light to be emitted from the side or back of the display device to increase the illumination in a low light condition or enhance the brightness of the computer display and liquid crystal monitor. In a back-lit liquid crystal display device, the light that radiates out from the light source is oriented through a polarizer to become unidirectional, so that photons are vibrated in a specific direction toward the liquid crystal molecular layer. The light, after passing through the polarizer, passes through the liquid crystal molecular layer, another polarizer and then a color filter, to show color images on the display panel. To achieve higher color purity, the display device may further comprise filters so that only a portion of the light emitted from the light-emitting diode with a specific wavelength can pass through the filters. However, such an arrangement will inevitably lower the performance of the display device. In view of this, the experts in the industry are focusing on the development of phosphors with narrow emission spectra.

Examples of phosphors include oxide phosphors and nitride phosphors. Nitride phosphors have therefore taken on increased significance in recent years because they have better thermal stability and more redshifted emission spectra by virtue of their firm structures and stronger electron cloud expansion effects. In terms of the red emission band, (Ca, Sr)$AlSiN_3:Eu^{2+}$ is one of the most notable nitride phosphors because it has an adjustable spectrum with a peak value ranging from about 620 nm to about 650 nm. However, this nitride phosphor has an overly broad emission spectrum, and a portion of the emission spectrum falls outside the sensitivity curve of the human eye so that the emission efficiency of the device will be lowered. In view of this, in 2014, Wolfgang Schnick et al. disclose a phosphor $SrLiAl_3N_4:Eu^{2+}$ (SLA) with a narrow emission spectrum (referring to "*Nature Materials,* 2014, Vol. 13, p. 891-896"). The phosphor has a full width at half maximum (FWHM) of only 50 nm, an emission peak value of 650 nm, and good thermal stability. However, the phosphor must be synthesized through a radio frequency furnace by using hydrides or nitrides as starting materials under a mixed atmosphere of hydrogen and nitrogen. The complex synthesizing process makes the phosphor difficult to be mass-produced. Moreover, the emission efficiency of the synthesized phosphor is poor and needs to be improved.

SUMMARY OF THE INVENTION

In view of the aforementioned technical problems, the present invention provides a method for manufacturing a nitride phosphor. The nitride phosphor prepared by the method of the present invention is provided with excellent properties, including excellent emission efficiency, light attenuation, thermal resistance, and quantum efficiency. The nitride phosphor is useful in manufacturing a $SrLiAl_3N_4:Eu^{2+}$ (SLA) phosphor with high illumination performance and a narrow emission spectrum.

As described in the following inventive objective, the present invention performs the manufacturing of a nitride phosphor through hot isostatic pressing by adding a barium-containing nitride as a flux into a formulation for synthesizing the nitride phosphor, so that the nitride phosphor prepared thereby will have the aforementioned advantages.

An objective of the present invention is to provide a method for manufacturing a nitride phosphor, comprising the following steps:

providing a nitride phosphor formulation comprising a flux and a phosphor precursor, wherein the flux is a barium-containing nitride and the phosphor precursor comprises two or more metal nitrides, and wherein a plurality of metal elements are present in the nitride phosphor and the two or more metal nitrides contain the plurality of metal elements; and subjecting the nitride phosphor formulation to a hot isostatic pressing step.

To render the above objective, technical features and advantages of the present invention more apparent, the present invention will be described in detail with reference to some embodiments hereinafter.

DESCRIPTION OF THE PREFERRED EMBODIMENT

Figure 1:
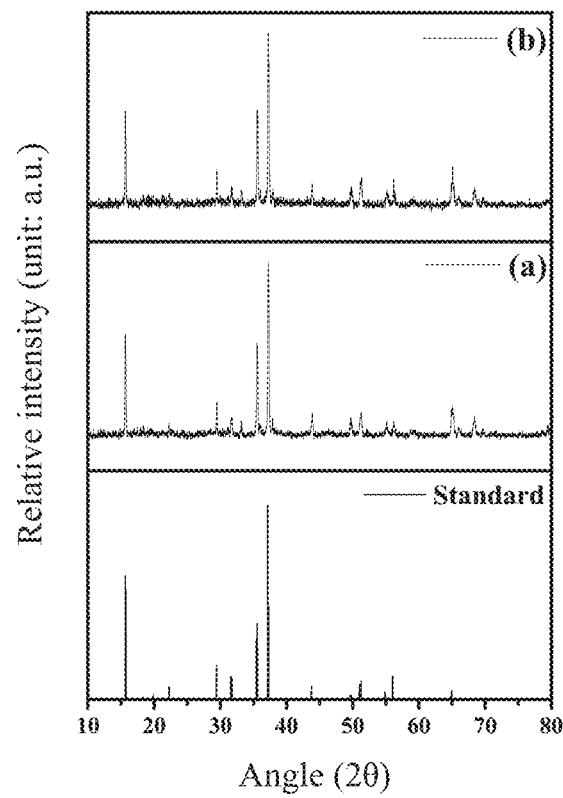
FIG. 1 shows the comparison between the X-ray powder diffraction patterns of two nitride phosphors $SrLiAl_3N_4:Eu^{2+}$ (SLA) and the standard pattern from Joint Committee on Powder Diffraction Standard (JCPDS), wherein the nitride phosphor (a) was prepared without using a barium-containing nitride as a flux, while the nitride phosphor (b) was prepared by using a barium-containing nitride as a flux.

Hereinafter, some embodiments of the present invention will be described in detail. However, without departing from the spirit of the present invention, the present invention may be embodied in various embodiments and should not be limited to the embodiments described in the specification. Furthermore, for clarity, the size of each element and each area may be exaggerated in the appended drawings and not depicted in actual proportion. Unless it is additionally explained, the expressions "a," "the," or the like recited in the specification (especially in the claims) should include both the singular and the plural forms.

The method for manufacturing a nitride phosphor according to the present invention includes adding a barium-containing nitride as a flux into the raw material formulation of nitride phosphor to improve the properties of the nitride phosphor thus prepared, including emission efficiency, light attenuation, and thermal resistance, by means of the flux effect from the flux.

Specifically, the method of the present invention includes a step of providing a nitride phosphor formulation, and a step of subjecting the nitride phosphor formulation to a hot isostatic pressing to form the nitride phosphor. An example of the nitride phosphor is SrLiAl$_3$N$_4$:Eu$^{2+}$.

The nitride phosphor includes a plurality of metal elements, and the phosphor precursor in the nitride phosphor formulation forms the nitride phosphor after the hot isostatic pressing step. Therefore, the phosphor precursor comprises two or more metal nitrides to provide the plurality of metal elements. Since the plurality of metal elements are present in the nitride phosphor at a molar ratio, each of the two or more metal nitrides is present in an amount to provide the corresponding metal element at the molar ratio. For example, when preparing SrLiAl$_3$N$_4$:Eu$^{2+}$, the nitride precursor may comprise strontium nitride, lithium nitride, aluminum nitride, and europium nitride. The amount of each metal nitride is determined in accordance with the molar ratio of Sr, Li, Al, and Eu in the nitride phosphor. In the appended example, the metal nitrides are present in amounts so that the molar ratio of Sr:Li:Al:Eu is 0.98:1:3:0.02. However, the present invention is not limited thereto.

One feature of the present invention is to use a barium-containing nitride as a flux to provide a phosphor with high emission efficiency. Without being restricted by any theories, it is believed that the aforementioned efficacy is a result of the larger particle size of the phosphor. Examples of the barium-containing nitride include Ba$_3$N$_2$. According to the present invention, the amount of the flux is not particularly limited, as long as the desired flux effect can be provided. For example, in the case of preparing SrLiAl$_3$N$_4$:Eu$^{2+}$, the flux may be present in an amount so that the molar ratio of barium to strontium ranges from about 0.05 to about 0.4, such as 0.1, 0.15, 0.2, 0.25, 0.3, or 0.35. In the appended example, the flux is in an amount so that the molar ratio of barium to strontium is about 0.1.

Another feature of the present invention is to subject the nitride phosphor formulation to a hot isostatic pressing to form the nitride phosphor. In general, the hot isostatic pressing step is performed in an inert atmosphere at a temperature ranging from about 800° C. to about 1500° C. and a pressure ranging from about 10 MPa to about 200 MPa. The preferred parameters area temperature ranging from about 900° C. to about 1100° C. and a pressure ranging from about 50 MPa to about 150 MPa. In the appended example, the hot isostatic pressing step is performed in a nitrogen atmosphere at a temperature of 1000° C. and a pressure of 100 MPa.

The present invention will be further illustrated by the embodiments hereinafter.

EXAMPLE 1

Barium nitride (Ba$_3$N$_2$, a flux), strontium nitride, lithium nitride, aluminum nitride, and europium nitride were weighed and ground in a boron nitride mortar for 30 minutes, wherein the molar ratio of Ba:Sr:Li:Al:Eu is 0.1:0.98:1:3:0.02. The grounded mixture was then pressed in a hot isostatic pressing furnace (trade name: AIP6-30H) under a temperature of 1000° C. and a pressure of 100 MPa in a nitrogen atmosphere for four hours. The resultant product was ground in the mortar to obtain SrLiAl$_3$N$_4$:Eu$^{2+}$ (SLA) nitride phosphor particles.

COMPARATIVE EXAMPLE 1

The preparation procedures of Example 1 were repeated to prepare a comparative nitride phosphor, except that barium nitride was not used.

Comparison Analysis

The following properties of each nitride phosphors prepared by Example 1 and Comparative Example 1 were respectively analyzed: X-ray powder diffraction pattern (measured by D2 Phaser diffractometer, available from Bruker), excitation spectrum (measured by FluoroMax-3, available from HORIBA), emission spectrum (measured by FluoroMax-3, available from HORIBA), light attenuation and thermal resistance (measured by FluoroMax-3 equipped with THMS-600 temperature controller, available from HORIBA), internal quantum efficiency (IQE) (measured by QY C11347, available from HAMAMATSU), absorption efficiency (Abs) (measured by QY C11347, available from HAMAMATSU), and external quantum efficiency (EQE) (measured by QY C11347, available from HAMAMATSU). In addition, the structure of each of the nitride phosphors was observed through a scanning electron microscope (trade name: Table Microscope TM-1000, available from Hitachi High-Technologies Corporation). The results are described below.

FIG. 1 shows the comparison between the X-ray powder diffraction patterns of the prepared nitride phosphors and the standard pattern from JCPDS, wherein the nitride phosphor (a) is the nitride phosphor prepared in Comparative Example 1 without using a barium-containing nitride as a flux, while the nitride phosphor (b) is the nitride phosphor prepared in Example 1 by using a barium-containing nitride as a flux. As shown in FIG. 1, the nitride phosphors each has a near-single-phase crystal structure, which belongs to triclinic, with a space group of PT (No. 2) and lattice parameters of a=5.8663 Å, b=7.5109 Å, and c=9.9654 Å.

Figure 2:
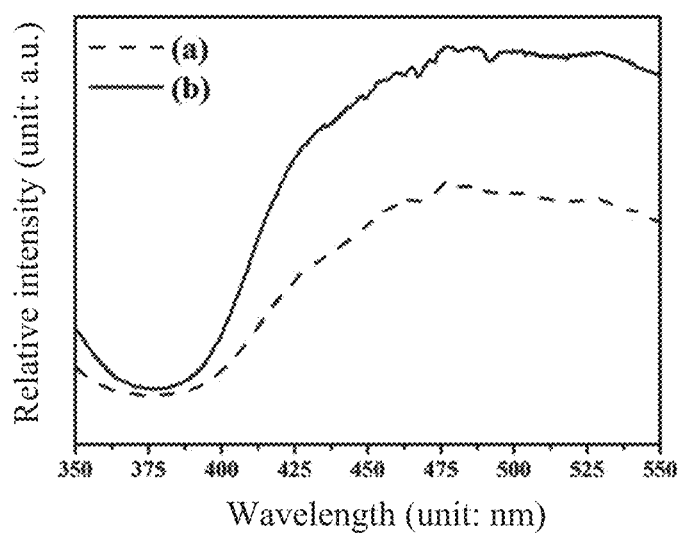
FIG. 2 shows the excitation spectra of two nitride phosphors $SrLiAl_3N_4:Eu^{2+}$ (SLA), wherein the nitride phosphor (a) was prepared without using a barium-containing nitride as a flux, while the nitride phosphor (b) was prepared by using a barium-containing nitride as a flux.

FIG. 2 shows the excitation spectra of the nitride phosphors, wherein the nitride phosphor (a) is the nitride phosphor prepared in Comparative Example 1 without using a barium-containing nitride as a flux, while the nitride phosphor (b) is the nitride phosphor prepared in Example 1 by using a barium-containing nitride as a flux. As shown in FIG. 2, the nitride phosphors can be excited through a blue light-emitting diode with an emission wavelength ranging from 440 nm to 480 nm.

Figure 3:
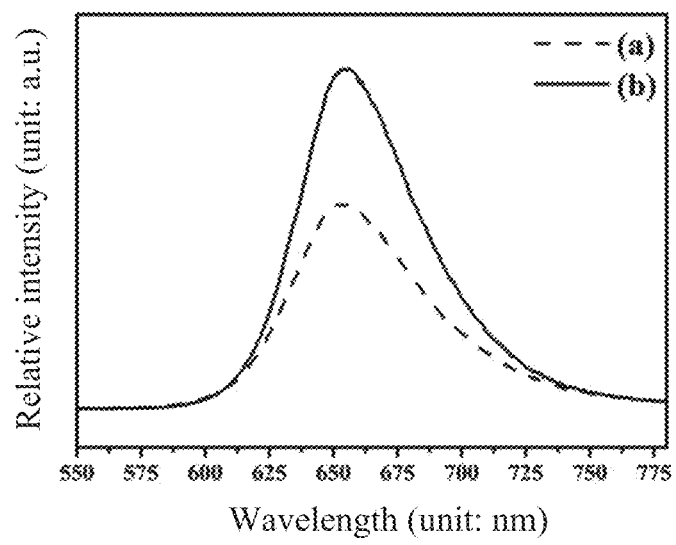
FIG. 3 shows the emission spectra of two nitride phosphors SrLiAl$_3$N$_4$:Eu$^{2+}$ (SLA), wherein the nitride phosphor (a) was prepared without using a barium-containing nitride as a flux, while the nitride phosphor (b) was prepared by using a barium-containing nitride as a flux.

FIG. 3 shows the emission spectra of the nitride phosphors, wherein the nitride phosphor (a) is the nitride phosphor prepared in Comparative Example 1 without using a barium-containing nitride as a flux, while the nitride phosphor (b) is the nitride phosphor prepared in Example 1 by using a barium-containing nitride as a flux. As shown in FIG. 3, both nitride phosphors emit 650 nm red light and have a full width at half maximum of 50 nm. However, the nitride phosphor (b) prepared according to the method of the present invention has higher emission efficiency, which is about 25% higher than that of the nitride phosphor (a).

Figure 4A:
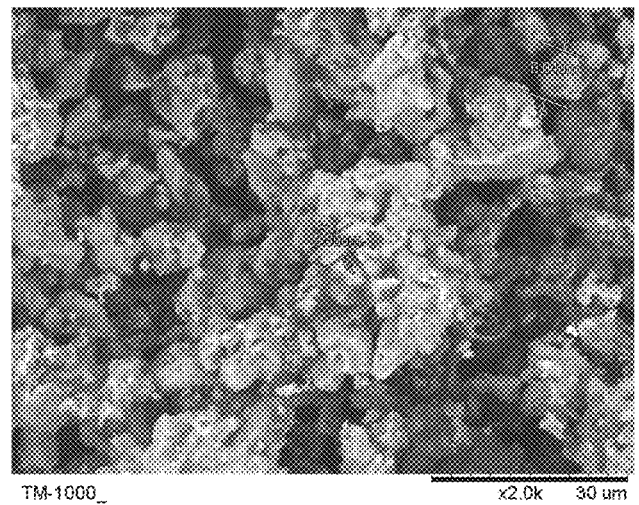
FIGS. 4a and 4b are the scanning electron microscope images of two nitride phosphors SrLiAl$_3$N$_4$:Eu$^{2+}$ (SLA), wherein nitride phosphor shown in FIG. 4a was prepared without using a barium-containing nitride as a flux, while the nitride phosphor shown in FIG. 4b was prepared by using a barium-containing nitride as a flux.
Figure 4B:
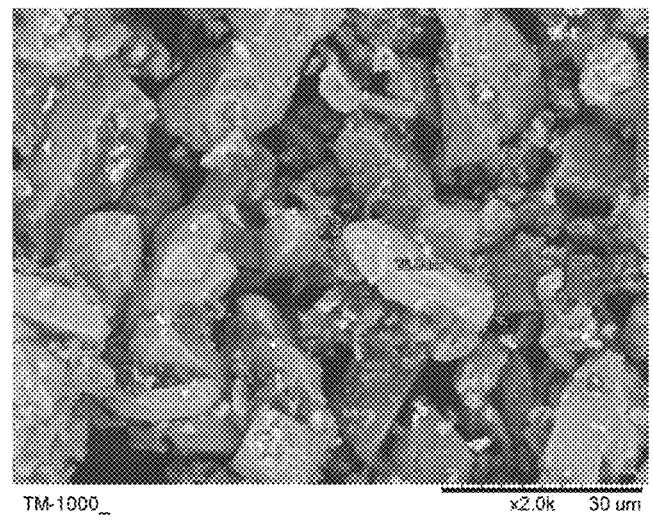

FIGS. 4a and 4b are the scanning electron microscope images of the nitride phosphors, wherein FIG. 4a is the scanning electron microscope image of the nitride phosphor prepared in Comparative Example 1 and FIG. 4b is the scanning electron microscope image of the nitride phosphor prepared in Example 1. As shown in FIGS. 4a and 4b, the nitride phosphor (b) prepared according to the method of the present invention has a phosphor particle size ranging from about 20 μm to about 30 μm, which is much larger than the phosphor particle size of the nitride phosphor (a). It is evidenced that the present invention can significantly increase the phosphor particle size by means of using a barium-containing nitride as a flux.

Figure 5:
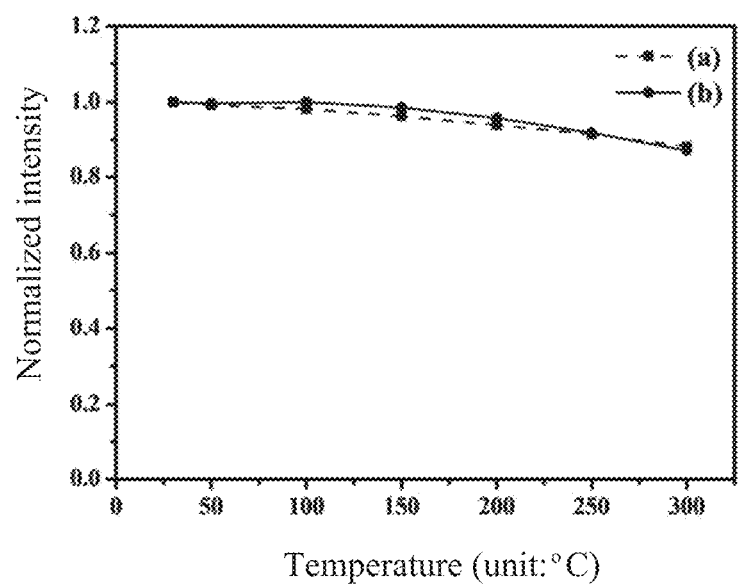
FIG. 5 shows the light attenuation and thermal resistance of two nitride phosphors SrLiAl$_3$N$_4$:Eu$^{2+}$ (SLA), wherein the nitride phosphor (a) was prepared without using a barium-containing nitride as a flux, while the nitride phosphor (b) was prepared by using a barium-containing nitride as a flux.

FIG. 5 shows the light attenuation and thermal resistance of the nitride phosphors, wherein the nitride phosphor (a) is the nitride phosphor prepared in Comparative Example 1 without using a barium-containing nitride as a flux, while the nitride phosphor (b) is the nitride phosphor prepared in Example 1 by using a barium-containing nitride as a flux. As shown in FIG. 5, with respect to the thermal resistance, the light attenuation of both nitride phosphors within 150° C. is lower than 95%, but obviously the thermal resistance of the nitride phosphor (b) prepared according to the method of the present invention is better than that of the nitride phosphor (a).

The following Table 1 shows the internal quantum efficiency (IQE), absorption efficiency (Abs), and external quantum efficiency (EQE) of the nitride phosphors, wherein the nitride phosphor (a) is the nitride phosphor prepared in Comparative Example 1 without using a barium-containing nitride as a flux, while the nitride phosphor (b) is the nitride phosphor prepared in Example 1 by using a barium-containing nitride as a flux.

TABLE 1

|  | IQE | Abs | EQE |
| --- | --- | --- | --- |
| Nitride phosphor (a) | 0.514 | 0.659 | 0.339 |
| Nitride phosphor (b) | 0.665 | 0.751 | 0.499 |

As shown in Table 1, the nitride phosphor (b) prepared according to the method of the present invention is superior to the nitride phosphor (a) in terms of internal quantum efficiency, absorption efficiency, and external quantum efficiency. Specifically, the external quantum efficiency of the nitride phosphor (b) is about 25% higher than that of the nitride phosphor (a), and this is consistent with the emission efficiency results shown in FIG. 3.

According to the above analyses, by means of using a barium-containing nitride as a flux in the formulation of nitride phosphor, the method of the present invention can significantly increase the particle size of the nitride phosphor prepared from the formulation and thus improve the properties of the nitride phosphor, including emission efficiency, light attenuation and thermal resistance, and quantum efficiency.

The above examples are used to illustrate the principle and efficacy of the present invention and show the inventive features thereof. People skilled in this field may proceed with a variety of modifications and replacements based on the disclosures and suggestions of the invention as described without departing from the principle and spirit thereof. Therefore, the scope of protection of the present invention is that as defined in the claims as appended.

What is claimed is:

1. A method for manufacturing a $SrLiAl_3N_4:Eu^{2+}$ nitride phosphor, comprising:
providing a nitride phosphor formulation comprising a flux and a phosphor precursor, wherein the flux is a barium-containing nitride and the phosphor precursor comprises two or more metal nitrides, and wherein a plurality of metal elements are present in the $SrLiAl_3N_4:Eu^{2+}$ nitride phosphor and the two or more metal nitrides contain the plurality of metal elements; and
subjecting the nitride phosphor formulation to a hot isostatic pressing step.

2. The method of claim 1, wherein the plurality of metal elements are present in the $SrLiAl_3N_4:Eu^{2+}$ nitride phosphor at a molar ratio and the two or more metal nitrides are present in the phosphor precursor in amounts to provide the plurality of metal elements at the molar ratio.

3. The method of claim 2, wherein the phosphor precursor comprises strontium nitride, lithium nitride, aluminum nitride, and europium nitride.

4. The method of claim 3, wherein the flux is in an amount so that the molar ratio of barium to strontium is about 0.05 to about 0.4.

5. The method of claim 1, wherein the flux is $Ba_3N_2$.

6. The method of claim 1, wherein the hot isostatic pressing step is performed at a temperature of about 800° C. to about 1500° C. and a pressure of about 10 MPa to about 200 MPa.

7. The method of claim 6, wherein the hot isostatic pressing step is performed at a temperature of about 900° C. to about 1100° C. and a pressure of about 50 MPa to about 150 MPa.

8. The method of claim 1, wherein the hot isostatic pressing step is performed in an inert atmosphere.

9. The method of claim 2, wherein the flux is $Ba_3N_2$.

10. The method of claim 2, wherein the hot isostatic pressing step is performed at a temperature of about 800° C. to about 1500° C. and a pressure of about 10 MPa to about 200 MPa.

11. The method of claim 10, wherein the hot isostatic pressing step is performed at a temperature of about 900° C. to about 1100° C. and a pressure of about 50 MPa to about 150 MPa.

12. The method of claim 2, wherein the hot isostatic pressing step is performed in an inert atmosphere.

13. The method of claim 3, wherein the flux is $Ba_3N_2$.

14. The method of claim 3, wherein the hot isostatic pressing step is performed at a temperature of about 800° C. to about 1500° C. and a pressure of about 10 MPa to about 200 MPa.

15. The method of claim 14, wherein the hot isostatic pressing step is performed at a temperature of about 900° C. to about 1100° C. and a pressure of about 50 MPa to about 150 MPa.

16. The method of claim 3, wherein the hot isostatic pressing step is performed in an inert atmosphere.

17. The method of claim 4, wherein the flux is $Ba_3N_2$.

18. The method of claim 4, wherein the hot isostatic pressing step is performed at a temperature of about 800° C. to about 1500° C. and a pressure of about 10 MPa to about 200 MPa.

19. The method of claim 18, wherein the hot isostatic pressing step is performed at a temperature of about 900° C. to about 1100° C. and a pressure of about 50 MPa to about 150 MPa.

20. The method of claim 4, wherein the hot isostatic pressing step is performed in an inert atmosphere.

\* \* \* \* \*